(12) United States Patent  
Ueda et al.

(10) Patent No.: US 9,352,774 B2  
(45) Date of Patent: May 31, 2016

(54) VEHICLE DRIVING ASSISTANCE APPARATUS

(71) Applicant: DENSO CORPORATION, Kariya, Aichi-pref. (JP)

(72) Inventors: Yusuke Ueda, Nishio (JP); Motonori Tominaga, Anjo (JP); Tomohiko Tsuruta, Aichi-ken (JP); Takeshi Hatoh, Nagoya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 13/788,387

(22) Filed: Mar. 7, 2013

(65) Prior Publication Data

US 2013/0238194 A1 Sep. 12, 2013

(30) Foreign Application Priority Data

Mar. 9, 2012 (JP) ................. 2012-053333

(51) Int. Cl.  
*B62D 6/00* (2006.01)  
*B62D 15/02* (2006.01)

(52) U.S. Cl.  
CPC ............. *B62D 6/00* (2013.01); *B62D 15/025* (2013.01)

(58) Field of Classification Search  
CPC ....................................... G08B 21/00  
See application file for complete search history.

(56) References Cited

U.S. PATENT DOCUMENTS

| 7,865,277 B1* | 1/2011 | Larson et al. .................. 701/23 |
| 2004/0153228 A1* | 8/2004 | Matsumoto et al. ............ 701/41 |
| 2010/0191434 A1* | 7/2010 | Fujita et al. .................... 701/91 |
| 2010/0267379 A1* | 10/2010 | Stahlin et al. ............... 455/426.1 |

FOREIGN PATENT DOCUMENTS

JP 2000-251171 9/2000

* cited by examiner

*Primary Examiner* — John R Olszewski  
*Assistant Examiner* — Jason Roberson  
(74) *Attorney, Agent, or Firm* — Harness, Dickey & Pierce, P.L.C.

(57) ABSTRACT

A vehicle driving assistance apparatus mounted in a vehicle. In the apparatus, a drivable route detection unit detects a drivable route, a vehicle state quantity detection unit detects state quantities of the vehicle, and a steering control unit controls steering of the vehicle. Further, in the apparatus, an allowable region estimation unit estimates a driving allowable region on the basis of the detected state quantities and a predetermined allowable range of behavior of the vehicle. A deviation determination unit determines that the vehicle will deviate from the drivable route when a minimum width of an overlap region of the drivable route and the driving allowable region is less than a predetermined threshold. An intervention instruction unit then outputs to the steering control unit an intervention control signal to control steering of the vehicle.

11 Claims, 19 Drawing Sheets

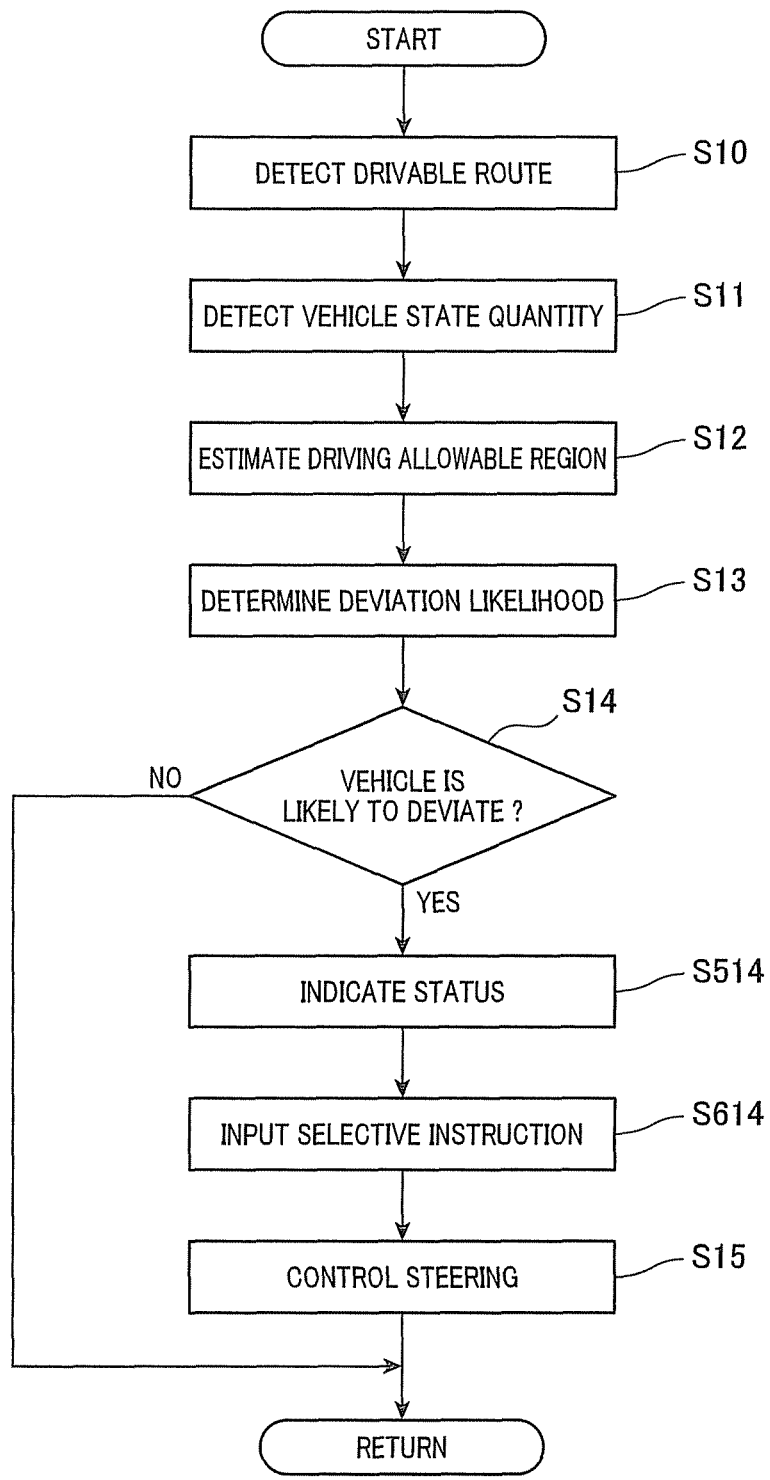

VEHICLE DRIVING ASSISTANCE APPARATUS

CROSS-REFERENCE TO RELATED APPLICATION

This application is based on and claims the benefit of priority from earlier Japanese Patent Application No. 2012-53333 filed Mar. 9, 2012, the description of which is incorporated herein by reference.

BACKGROUND

1. Technical Field

The present invention relates to a vehicle driving assistance apparatus that assists in traveling along a lane line or in a traveling lane.

2. Related Art

A known warning apparatus, as disclosed in Japanese Patent Application Laid-Open Publication No. 2000-251171, provides a warning to a driver when his/her vehicle is deviating from a traveling lane so that the vehicle is driven to travel in the lane. The warning may be provided by generating a warning sound via a speaker, lighting a caution-advisory indicator, or vibrating a steering wheel or the like.

In the above disclosed apparatus, when it is determined that at least one of wheels of the vehicle has reached the lane line, it is determined that the vehicle is deviating from the traveling lane. This determination triggers the apparatus to provide the warning to the driver or to conduct lane deviation avoidance control via automatic steering control.

In the above disclosed apparatus, however, when the wheel has reached the lane line of the traveling lane, it is determined that the vehicle is deviating from the travelling lane. With such a configuration, when the vehicle is deviating from the travelling lane at a large approaching angle, the lane deviation avoidance control after reaching the lane line may not reliably prevent the vehicle from deviating from the traveling lane.

In addition, since the lane deviation avoidance control requires rapid changes in traveling direction of the vehicle, each occupant may experience a high lateral G-force, which may prevent comfortable driving from being maintained. Further, the rapid changes in traveling direction of the vehicle may often lead to an unstable vehicle behavior. This may prevent safe driving from being ensured.

In consideration of the foregoing, it would therefore be desirable to have a vehicle driving assistance apparatus capable of assisting in avoiding a vehicle mounting the apparatus therein from deviating from a traveling lane while ensuring comfortable and safe driving.

SUMMARY

In accordance with an exemplary embodiment of the present invention, there is provided a vehicle driving assistance apparatus mounted in a vehicle. The apparatus includes a drivable route detection unit that detects a drivable route on which the vehicle may travel; a vehicle state quantity detection unit that detects state quantities of the vehicle; a steering control unit that controls steering of the vehicle. The apparatus further includes an allowable region estimation unit that estimates a driving allowable region on the basis of the state quantities detected by the vehicle state quantity detection unit and a predetermined allowable range of behavior of the vehicle, the driving allowable region being a region where the vehicle is allowed to change its traveling direction within the predetermined allowable range of behavior of the vehicle; a deviation determination unit that compares a minimum width of an overlap region of the drivable route and the driving allowable region with a predetermined threshold for determining whether or not the vehicle will deviate from the drivable route; and an intervention instruction unit that, when it is determined that the minimum width of the overlap region is less than the predetermined threshold, outputs to the steering control unit an intervention control signal for instructing the steering control unit to perform intervention control of steering of the vehicle.

With this configuration, it is possible to determine whether or not the own vehicle will deviate from the drivable route prior to the vehicle reaching a lane marking that is a demarcation line of the drivable route.

More specifically, it is possible to determine, at a timing earlier than a timing at which the vehicle reaches or contacts the lane marking, whether or not the vehicle will deviate from the drivable route by comparing a minimum width of the overlap region of the drivable route and the driving allowable region with the predetermined threshold for determining deviation of the vehicle from the drivable route. In addition, since the determination is made before the vehicle reaches the lane marking, the vehicle is allowed to keep traveling along the drivable route by changing its traveling direction without moving out of the driving allowable region, even after the determination that the vehicle will deviate from the drivable route.

BRIEF DESCRIPTION OF THE DRAWINGS

In the accompanying drawings:

FIG. 19 shows a flowchart of a lane deviation avoidance control process performed in the vehicle driving assistance apparatus of FIG. 18.

DESCRIPTION OF SPECIFIC EMBODIMENTS

First Embodiment

A vehicle driving assistance apparatus 1 in accordance with a first embodiment will be explained with reference to FIG. 1 through FIG. 5. The vehicle driving assistance apparatus 1 of the present embodiment, which is a part of a preceding-vehicle following control system, such as an Adaptive Cruise Control (ACC) system or the like, assists a vehicle 2 mounting the apparatus 1 therein (hereinafter also referred to as the own vehicle) in traveling along a travel path.

Figure 1:
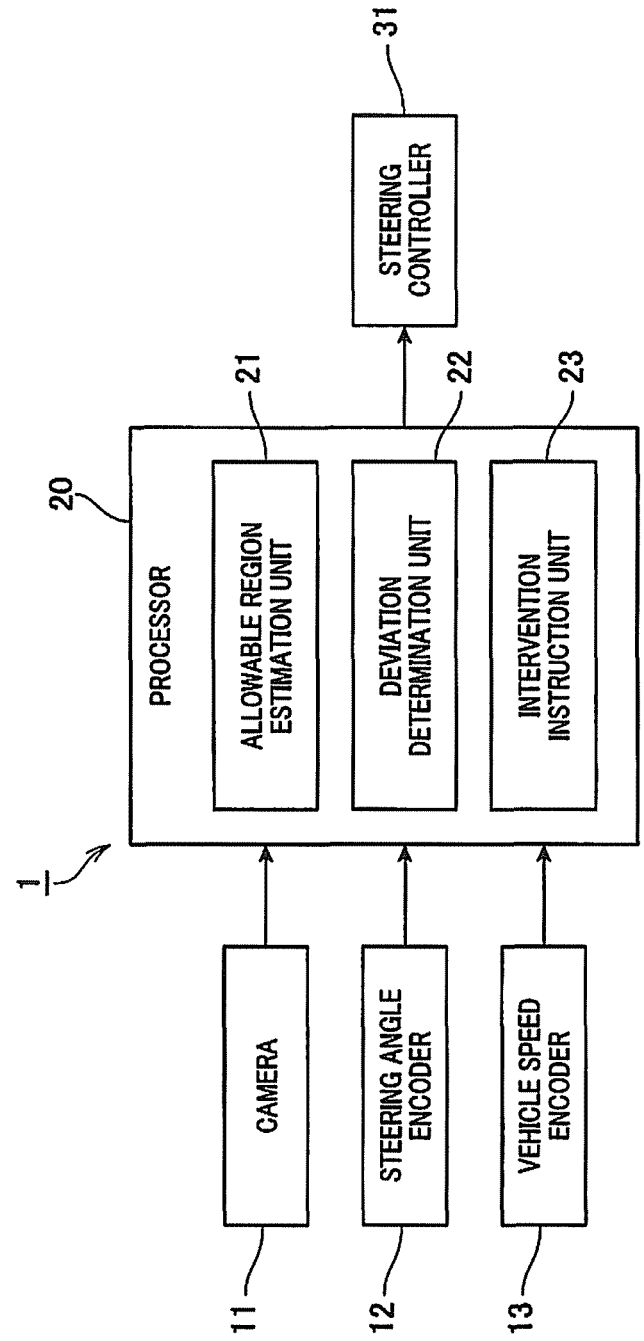
FIG. 1 shows a schematic block diagram of a vehicle driving assistance apparatus in accordance with a first embodiment of the present invention.

The vehicle driving assistance apparatus 1, as shown in FIG. 1, primarily includes a camera (serving as a drivable route detection unit) 11 used to detect a drivable route 41, a steering angle encoder (serving as a steering angle detector that is a part of a vehicle state quantity detection unit) 12 used to detect a steering angle of the own vehicle 2, which is a first state quantity of the own vehicle 2, a vehicle speed encoder (serving as a vehicle speed detector that is another part of the vehicle state quantity detection unit) 13 used to detect a traveling speed of the own vehicle 2, which is a second state quantity of the own vehicle 2, a processor 20 that determines whether or not the own vehicle 2 will deviate from a drivable route 41, and a steering controller (serving as a steering control unit) 31 that controls a steering angle of the own vehicle 2.

Figure 2:
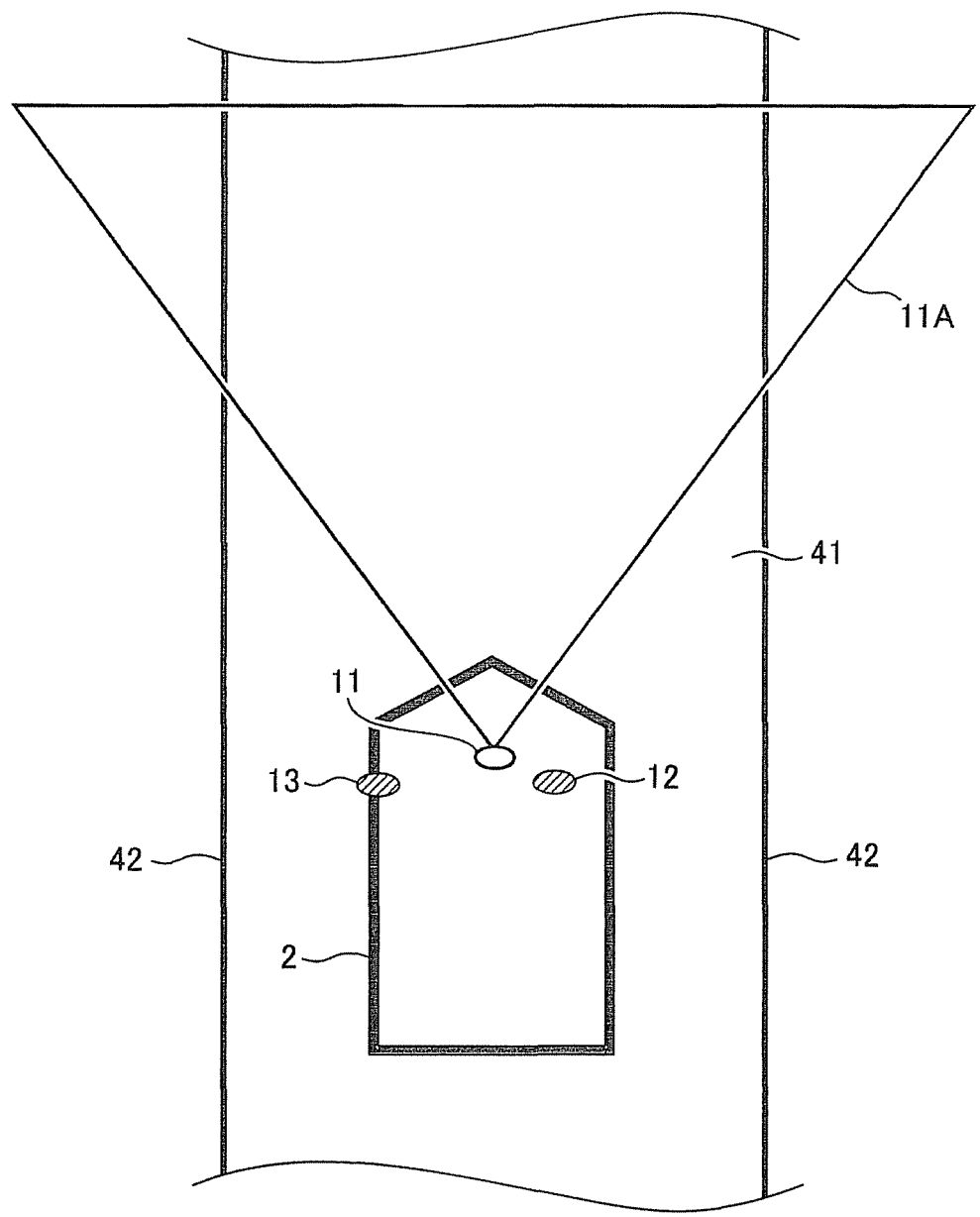
FIG. 2 shows an example of a detection area for detecting a drivable route by using a camera of FIG. 1.

The camera 11 captures an image of a detection area 11A in front of the own vehicle 2 as shown in FIG. 2. Information about the captured image is fed to the processor 20 and then used to detect the drivable route 41 of the own vehicle (see FIG. 3). Typical markers for determining the drivable route 41 include, for example, lane markings 42 parametric in a lane width, a lateral position of the own vehicle or the like. The markers other than the lane markings include guardrails, curbstones, protuberances provided on the road surface, walls at edges of the roadway and the like. In the processor 20, a well-known image processing technique may be used to detect the drivable route 41 on the basis of the image information.

The drivable route 41, here, refers to a roadway area where the own vehicle 2 can travel, such as a traveling lane or an overtaking lane or the like delimited by the lane markings 42 or the like. Further, the drivable route 41 may include only a drivable area in the traveling lane or the overtaking lane without obstacles that may interfere with the own vehicle 2.

The drivable route 41 may be detected by using the image captured by the camera 11 or by using laser radar, instead of the camera 11, which detects positions of obstacles present in the detection area 11A relative to the own vehicle.

The steering angle encoder 12, as shown in FIG. 1, is a sensor that detects a steering angle of the own vehicle 2 to output a signal responsive to the steering angle to the processor 20. The vehicle speed encoder 13 is a sensor that detects a traveling speed of the own vehicle 2 to output a signal responsive to the traveling speed to the processor 20. Each of the steering angle encoder 12 and the vehicle speed encoder 13 may be, but not limited to, a well-known sensor.

The traveling speed of the own vehicle 2 may be detected by using a signal from the vehicle speed encoder 13 or by using a satellite positioning device which determines a location of the own vehicle 2, such as a GPS device, instead of the vehicle speed encoder 13.

The processor 20 is primarily configured with an allowable region estimation unit 21, a deviation determination unit 22, and an intervention instruction unit 23. The processor 20 is a microcomputer having a central processing unit (CPU), a read-only memory (ROM), a random access memory (RAM), and an input/output interface and others. Running control programs stored in a storage device, such as the ROM or the like, allows the CPU to serve as the allowable region estimation unit 21, the deviation determination unit 22, and the intervention instruction unit 23.

Figure 3:
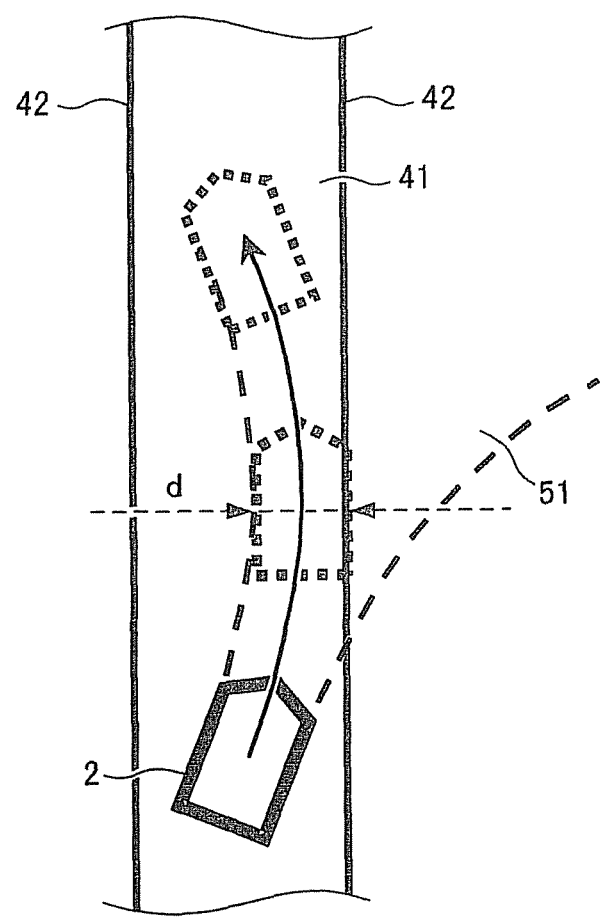
FIG. 3 shows an exemplary positional relationship between a drivable route and a driving allowable region.

The allowable region estimation unit 21 estimates a driving allowable region 51 as shown in FIG. 3, where the own vehicle 2 is allowed to change its traveling direction. The driving allowable region 51 is a region, the extent of which is defined on the basis of a predetermined allowable range of behavior of the own vehicle 2. The allowable range of behavior includes, but not limited to, an allowable range of lateral acceleration (lateral G-force) experienced by the own vehicle 2. A process of estimating the driving allowable region 51 performed by the allowable region estimation, unit 21 will be explained later in more detail.

The deviation determination unit 22 determines whether or not the own vehicle 2 will deviate from the drivable route 41, in other words, whether or not the own vehicle 2 can safely avoid deviating from the drivable route 41 without making the occupants feel uncomfortable. In the deviation determination unit 22, whether or not the own vehicle 2 will deviate from the drivable route 41 is determined by acquiring an overlap region of the drivable route 41 and the driving allowable region 51 and comparing a minimum width of the overlap region along the lateral direction of the drivable route 41 with a predetermined threshold d (see FIG. 3) for determining whether or not the own vehicle 2 will deviate from the drivable route 41. The predetermined threshold d is equal to or greater than the width of the own vehicle 2, preferably, equal to or greater than a sum of the width of the own vehicle 2 and a width of a space required to prevent a contact between the own vehicle 2 and an obstacle adjacent to the drivable route 41.

When it is determined that the own vehicle 2 will deviate from the drivable route 41, that is, the minimum width of the overlap region is less than the predetermined threshold d, the intervention instruction unit 23 generates an intervention control signal for avoiding the own vehicle 2 from deviating from the drivable route 41.

The steering controller 31 controls steering of the own vehicle 2 in response to the intervention control signal received from the intervention instruction unit 23. The steering controller 31 may have a well-known configuration for drive controlling the steering system of the own vehicle 2.

Figure 4:
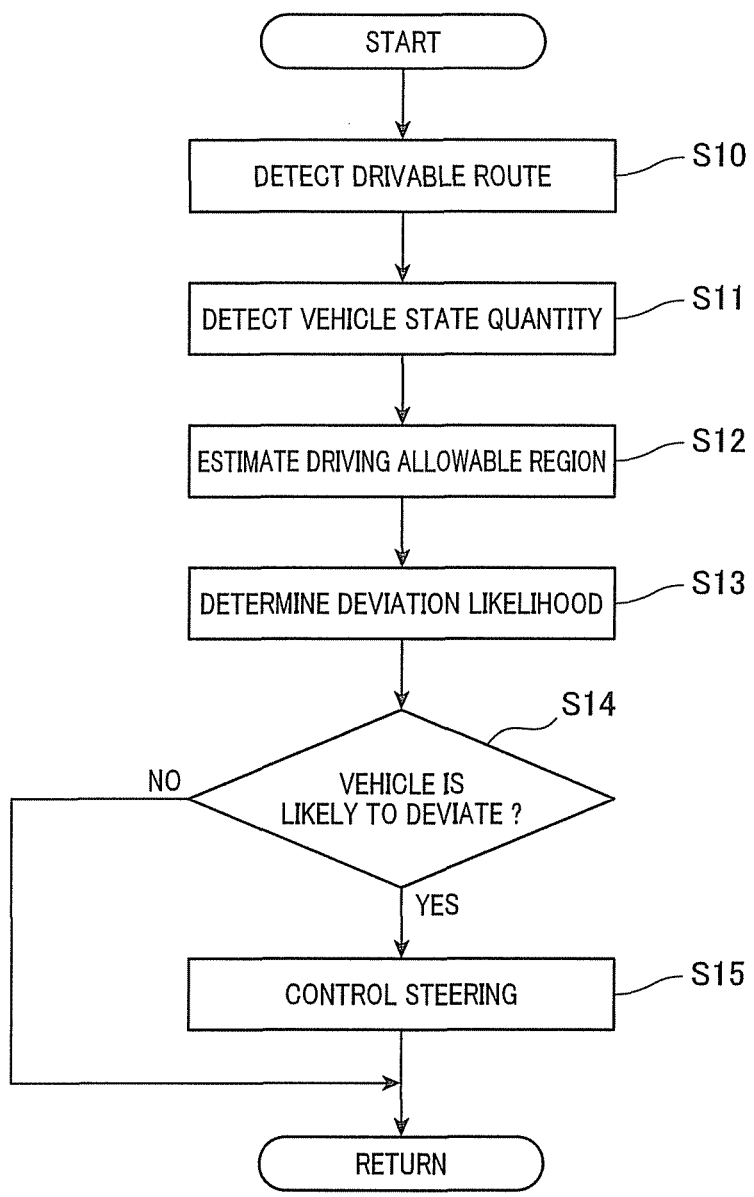
FIG. 4 shows a flowchart of a lane deviation avoidance control process performed in the vehicle driving assistance apparatus of FIG. 1.

There will now be explained a lane deviation avoidance control process for avoiding the own vehicle 2 from deviating from the drivable route 41, performed in the vehicle driving assistance apparatus 1 configured as above, with reference to a flowchart of FIG. 4.

Upon initiation of the preceding-vehicle following control of the own vehicle 2, the processor 20, in step S10, detects the drivable route 41 in which the own vehicle 2 is traveling by analyzing the image, captured by the camera 11, of the detection area 11A.

Subsequently, in step S11, the processor 20 detects a steering angle and a traveling speed and the like of the own vehicle 2, which are state quantities of the own vehicle 2. More specifically, the processor 20 processes signals received from the steering angle encoder 12 and the vehicle speed encoder 13.

In next step S12, the allowable region estimation unit 21 of the processor 20 estimates the driving allowable region 51. More specifically, the allowable region estimation unit 21 calculates a steering angle of the own vehicle 2 on the basis of the signal received from the steering angle encoder 12 and calculates a traveling speed of the own vehicle 2 on the basis of the signal received from the vehicle speed encoder 13. The allowable region estimation unit 21 estimates a travel path of the own vehicle 2 by using a yaw rate determined from the calculated steering angle and the calculated traveling speed of the own vehicle 2. After estimating the travel path, the allowable region estimation unit 21 estimates a driving allowable region 51 extending around the travel path by using the allowable range of behavior of the own vehicle 2. In the present embodiment, the allowable range of lateral G-force experienced by the own vehicle 2 is used as the predetermined allowable range of behavior of the own vehicle 2.

Subsequently, in step S13, the deviation determination unit 22 of the processor 20 determines a likelihood that the own vehicle 2 will deviate from the drivable route 41. The likelihood of deviating from the drivable route 41 is determined by acquiring an overlap region of the drivable route 41 and the driving allowable region 51 and comparing the minimum width of the overlap region along the lateral direction of the drivable route 41 with the predetermined threshold d for determining whether or not the own vehicle 2 will deviate from the drivable route 41. The likelihood that the own vehicle 2 will deviate from the drivable route 41 increases as the minimum width of the overlap region decreases to approach the predetermined threshold d.

The deviation determination unit 22, in step S14, determines whether or not the own vehicle 2 is likely to deviate from the drivable route 41 on the basis of the determination result of step S13. For example, when the minimum width of the overlap region is less than the predetermined threshold d, it is determined that the own vehicle 2 is likely to deviate from the drivable route 41. In the deviation determination unit 22, if it is determined in step S14 that the own vehicle 2 is not likely to deviate from the drivable route 41, then the process returns to step S10 and is repeated therefrom as described above in the processor 20.

In the deviation determination unit 22, if it is determined in step S14 that the own vehicle 2 is likely to deviate from the drivable route 41, then the deviation determination unit 22 outputs a signal indicative of the determination result to the intervention instruction unit 23. The intervention instruction unit 23, in step S15, outputs a steering control signal to the steering controller 31 to control the steering of the own vehicle 2.

The steering controller 31 controls the steering of the own vehicle 2 on the basis of the steering control signal received from the intervention instruction unit 23 to thereby avoid the own vehicle 2 from deviating from the drivable route 41 as shown in FIG. 3. After the steering control signal is fed to the steering controller 31, the process returns to step S10 and is repeated therefrom as described above in the processor 20.

The vehicle driving assistance apparatus 1 described above is configured to determine whether or not the own vehicle 2 will deviate from the drivable route 41 before reaching or touching one of lane markings 42 for the drivable route 41 (see FIG. 5), which leads to proper assistance in avoiding the own vehicle 2 from deviating from the drivable route 41.

In other words, it is allowed to determine whether or not the own vehicle 2 will deviate from the drivable route 41 before the own vehicle 2 reaches the lane marking 42 by acquiring an overlap region of the drivable route 41 and the driving allowable region 51 (where the own vehicle 2 is allowed to change its traveling direction) and determining whether or not a minimum width of the overlap region along the lateral direction of the drivable route 41 is less than a predetermined threshold d for determining whether or not the own vehicle 2 will deviate from the drivable route 41. In addition, since the deviation determination is made before the own vehicle 2 reaches the lane marking 42, the own vehicle 2 is allowed to keep traveling along the drivable route 41 by changing its traveling direction without moving out of the driving allowable region 51, even after the determination that the own vehicle 2 will deviate from the drivable route.

Figure 5:
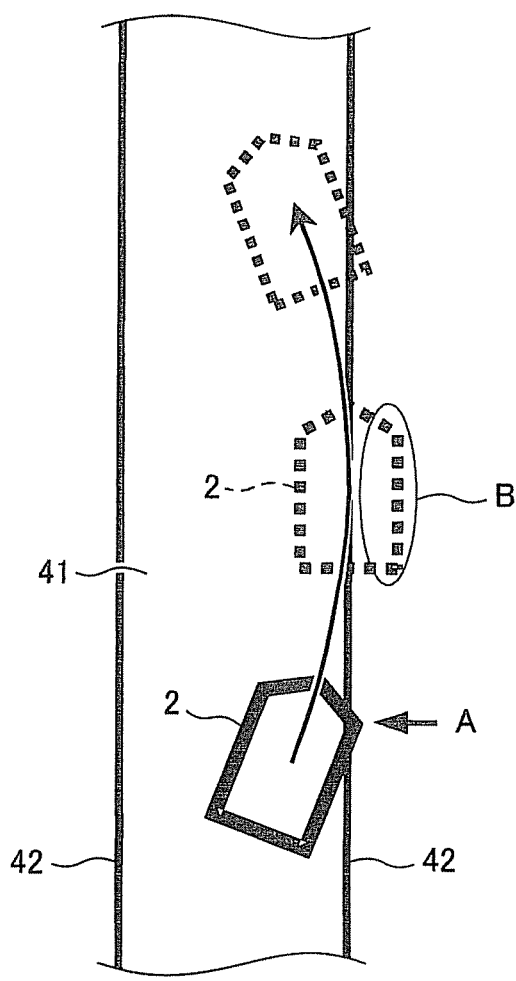
FIG. 5 shows an example of a travel path of a vehicle under a conventional lane deviation avoidance control.

Even though the own vehicle 2 is steering controlled to keep traveling along the drivable route 41 after reaching the lane marking 42 at a point A as shown in FIG. 5, at least a portion B of the own vehicle 2 may move out of the drivable route 41. In addition, rapid control to prevent the portion B of the own vehicle 2 from moving out of the drivable route 41 may lead to an excess of lateral G-force experienced by the occupants, which may make the occupants feel uncomfortable. Such rapid control may further cause the own vehicle 2 to skid on the road surface, which may prevent safe driving of the own vehicle 2.

In contrast, in the vehicle driving assistance apparatus 1 of the present embodiment described above, such rapid steering control of the own vehicle 2 doesn't have to be performed to keep traveling along the drivable route 41, which leads to comfortable and safe driving of the own vehicle 2.

Second Embodiment

There will now be explained a second embodiment of the present invention with reference to FIG. 6 through FIG. 8B. The vehicle driving assistance apparatus 101 of the present embodiment is similar to the vehicle driving assistance apparatus 1 of the first embodiment except that the steering control taking into account a friction coefficient $\mu$ of a road surface is performed. Only differences of the second embodiment from the first embodiment are explained. Similar descriptions are not repeated in detail for the present embodiment.

Figure 6:
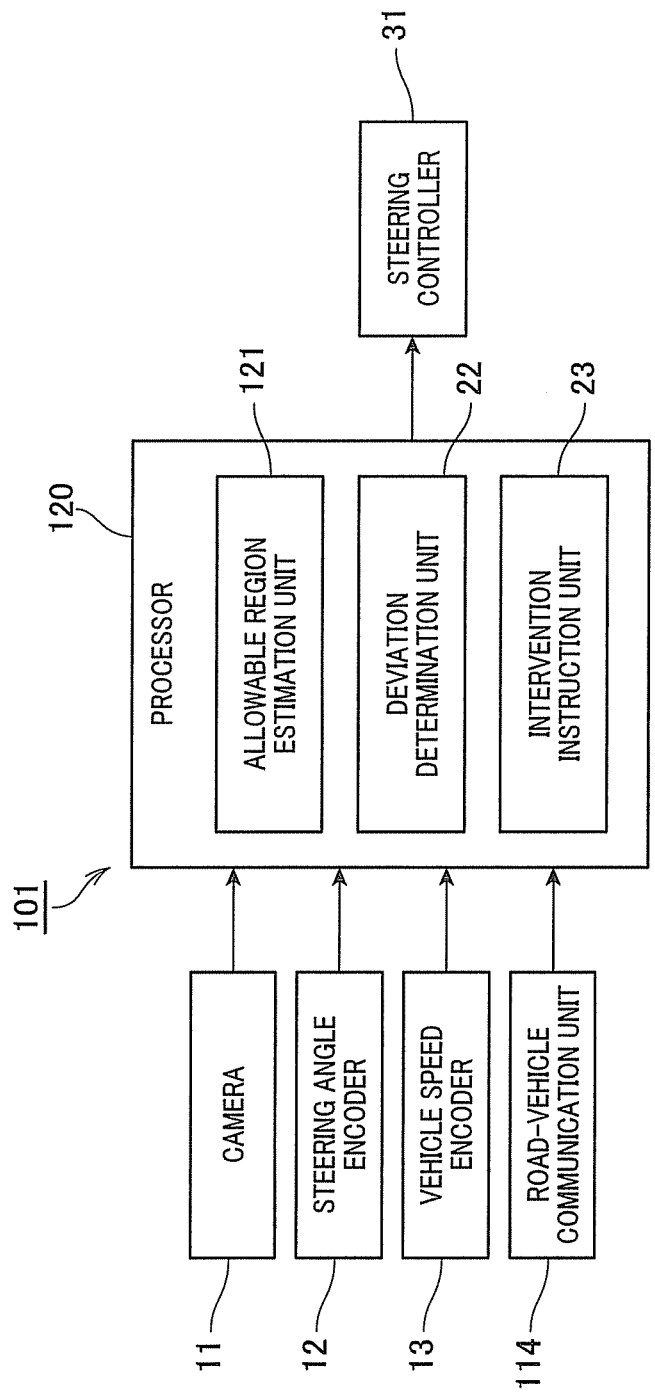
FIG. 6 shows a schematic block diagram of a vehicle driving assistance apparatus in accordance with a second embodiment of the present invention.

The vehicle driving assistance apparatus 101, as shown in FIG. 6, is similar to the vehicle driving assistance apparatus 1 of the first embodiment as described above except that a road-vehicle communication unit (serving as a road-surface condition acquisition unit) 114 is added for acquiring a road-surface friction coefficient $\mu$ of the drivable route 41 and an allowable region estimation unit 121 replaces the allowable region estimation unit 21.

The road-vehicle communication unit 114 acquires information from a road manager or the like responsible for managing the drivable route 41 and other roads via communications. In the present embodiment, the information includes a road-surface friction coefficient μ of the drivable route 41. The road-surface friction coefficient μ of the drivable route 41 acquired by the road-vehicle communication unit 114 is fed to the allowable region estimation unit 121 of the processor 120.

The road-surface friction coefficient μ of the drivable route 41 may be a road-surface friction coefficient μ of a predefined road surface measured by the road manager.

The processor 120 primarily includes the allowable region estimation unit 121, the deviation determination unit 22, and the intervention instruction unit 23.

The allowable region estimation unit 121 estimates a driving allowable region 51 in a similar manner as in the allowable region estimation unit 21 of the first embodiment except that the driving allowable region 51 is estimated further on the basis of the road-surface friction coefficient μ. A process of estimating the driving allowable region 51 to be performed in the allowable region estimation unit 121 will be explained later.

Figure 7:
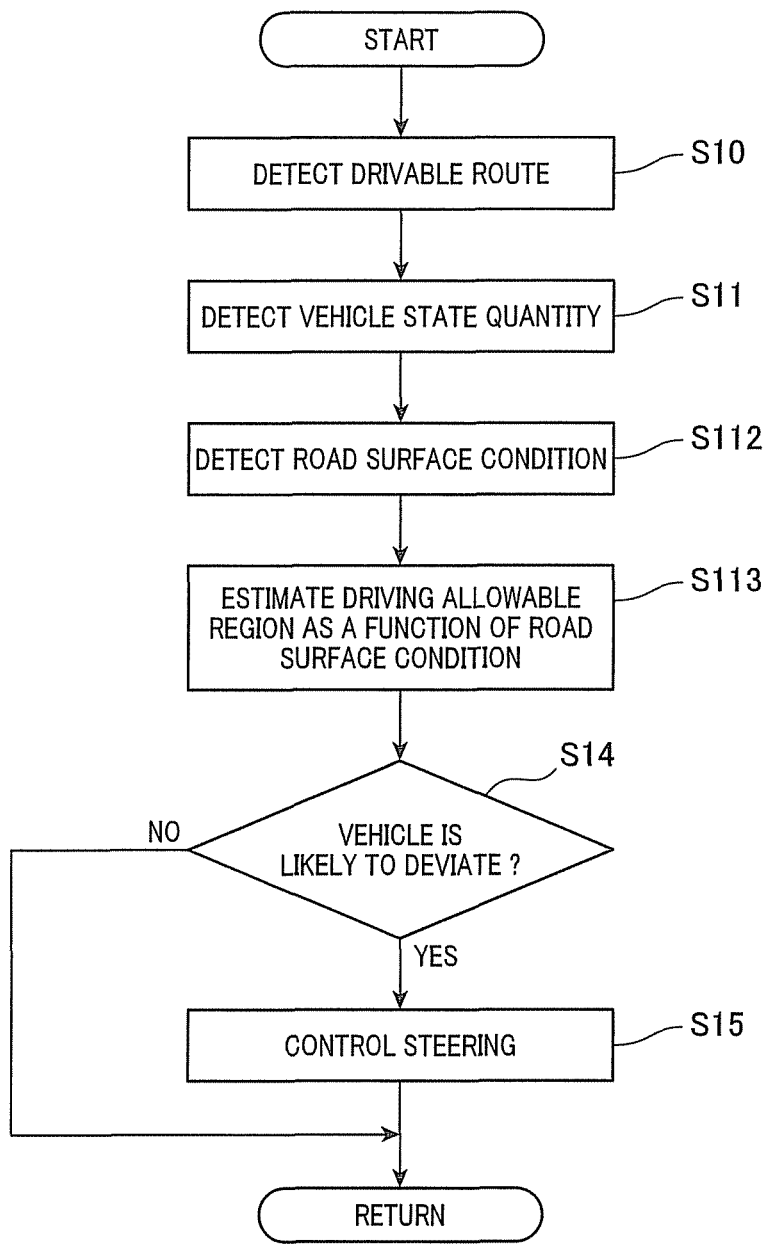
FIG. 7 shows a flowchart of a lane deviation avoidance control process performed in the vehicle driving assistance apparatus of FIG. 6.

There will now be explained a lane deviation avoidance control process for avoiding the own vehicle 2 from deviating from the drivable route 41, performed in the vehicle driving assistance apparatus 101 configured as above, with reference to a flowchart of FIG. 7.

The operations of steps S10 through S11 subsequent to the initiation of the preceding-vehicle following control are similar to those of the first embodiment, which therefore are not described in detail for the present embodiment.

After receiving the signals from the steering angle encoder 12 and the vehicle speed encoder 13 in step S11, the allowable region estimation unit 121 of the processor 120 acquires a road-surface friction coefficient μ indicative of a road surface condition in step S112. More specifically, the allowable region estimation unit 121 of the processor 120 outputs a signal to the road-vehicle communication unit 114 for acquiring a road-surface frictional coefficient μ of the drivable route 41 from an external source.

After acquiring the road-surface friction coefficient μ of the drivable route 41 in step S112, the allowable region estimation unit 121 of the processor 120 estimates a driving allowable region 51 in step S113 in a similar manner as in the allowable region estimation unit 21 of the first embodiment except that the allowable range of behavior used to estimate the driving allowable region 51 varies with the road-surface friction coefficient μ of the drivable route 41.

More specifically, an allowable range of lateral G-force, as a predetermined allowable range of behavior, is increased with an increasing road-surface friction coefficient μ and decreased with a decreasing road-surface friction coefficient μ.

Figure 8A:
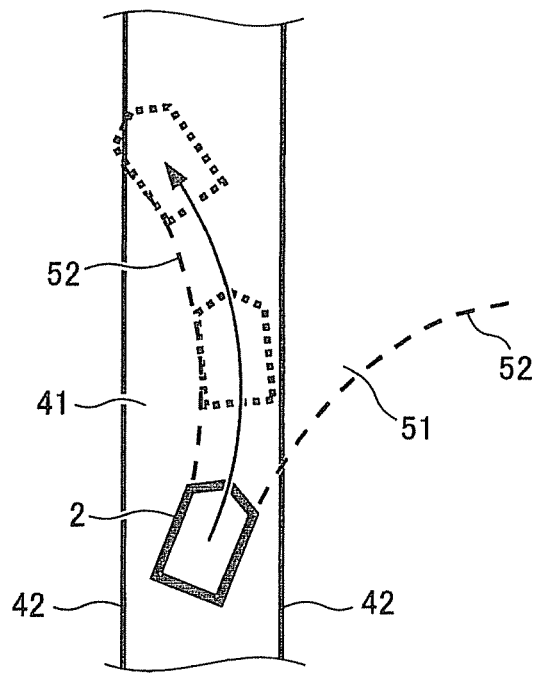
FIG. 8A shows an exemplary positional relationship between a drivable route and a driving allowable region for a large road-surface friction coefficient.

This means, as shown in FIG. 8A, a curvature of each driving allowable limit line 52, which is a demarcation line of the driving allowable region 51, increases with an increasing road-surface friction coefficient μ, so that the driving allowable region 51 becomes wider. On the other hand, as shown in FIG. 8B, the curvature of the driving allowable limit line 52 decreases with a decreasing road-surface friction coefficient μ, so that the driving allowable region 51 becomes narrower.

The operations of steps S14 through S15 subsequent to step S113 to be performed in processor 120 are similar to those of the first embodiment, which therefore are not explained in detail for the present embodiment.

Altering the driving allowable region 51 as a function of the road-surface friction coefficient μ leads to proper assistance in avoiding the own vehicle 2 from deviating from the drivable route 41. For example, when the road-surface friction coefficient μ is decreased due to road surface freezing or the like, the own vehicle 2 is more likely to skid on the road surface during steering. To prevent such skidding of the own vehicle 2, when the road-surface friction coefficient μ is decreased, the driving allowable region 51 is altered so that an upper limit of the lateral G-force is lowered. That is, the driving allowable region 51 is altered so that the curvature of the driving allowable limit line 52 is decreased.

Figure 8B:
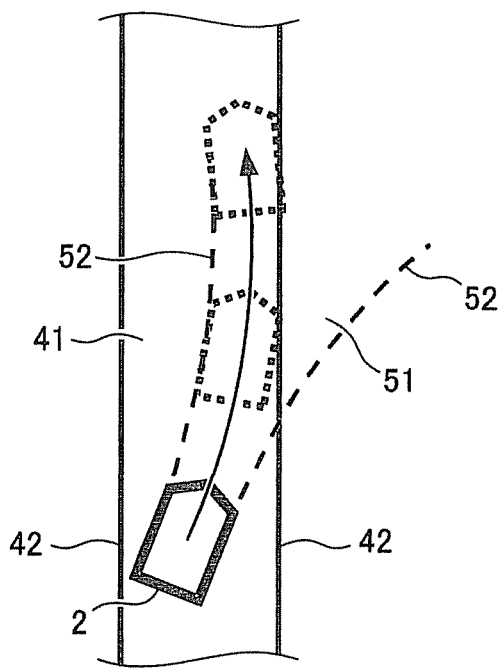
FIG. 8B shows an exemplary positional relationship between a drivable route and a driving allowable region for a small road-surface friction coefficient.

Hence, even when the road-surface friction coefficient μ is decreased, the lane deviation avoidance control is performed at an earlier timing as shown in FIG. 8B, thereby allowing the own vehicle 2 to avoid deviating from the drivable route 41 without skidding.

In addition, even when the lane deviation avoidance control is performed at a later timing, a large road-surface friction coefficient μ, as shown in FIG. 8A, allows the own vehicle 2 to avoid deviating from the drivable route 41 without skidding.

The road-surface friction coefficient μ of the drivable route 41 may be acquired via the road-vehicle communication unit 114 as described above or may be acquired from surroundings information received from other vehicles (i.e., from the outside of the own vehicle) via an inter-vehicle communication unit (not shown). Further, the road-surface friction coefficient μ of the drivable route 41 may continuously be estimated by calculating a change rate of wheel slippage rate on the basis of a difference in wheel speed between right and left wheels acquired from outputs of wheel speed sensors (not shown) or may continuously be estimated on the basis of accelerations along right and left directions of the own vehicle 2 detected by acceleration sensors (not shown).

Third Embodiment

There will now be explained a third embodiment of the present invention with reference to FIG. 9 through FIG. 11. The vehicle driving assistance apparatus 201 of the present embodiment is similar to the vehicle driving assistance apparatus 1 of the first embodiment except that the steering control taking into account the presence of obstacles in an environment around the own vehicle is performed. Only differences of the third embodiment from the first embodiment are explained. Similar descriptions are not repeated in detail for the present embodiment.

Figure 9:
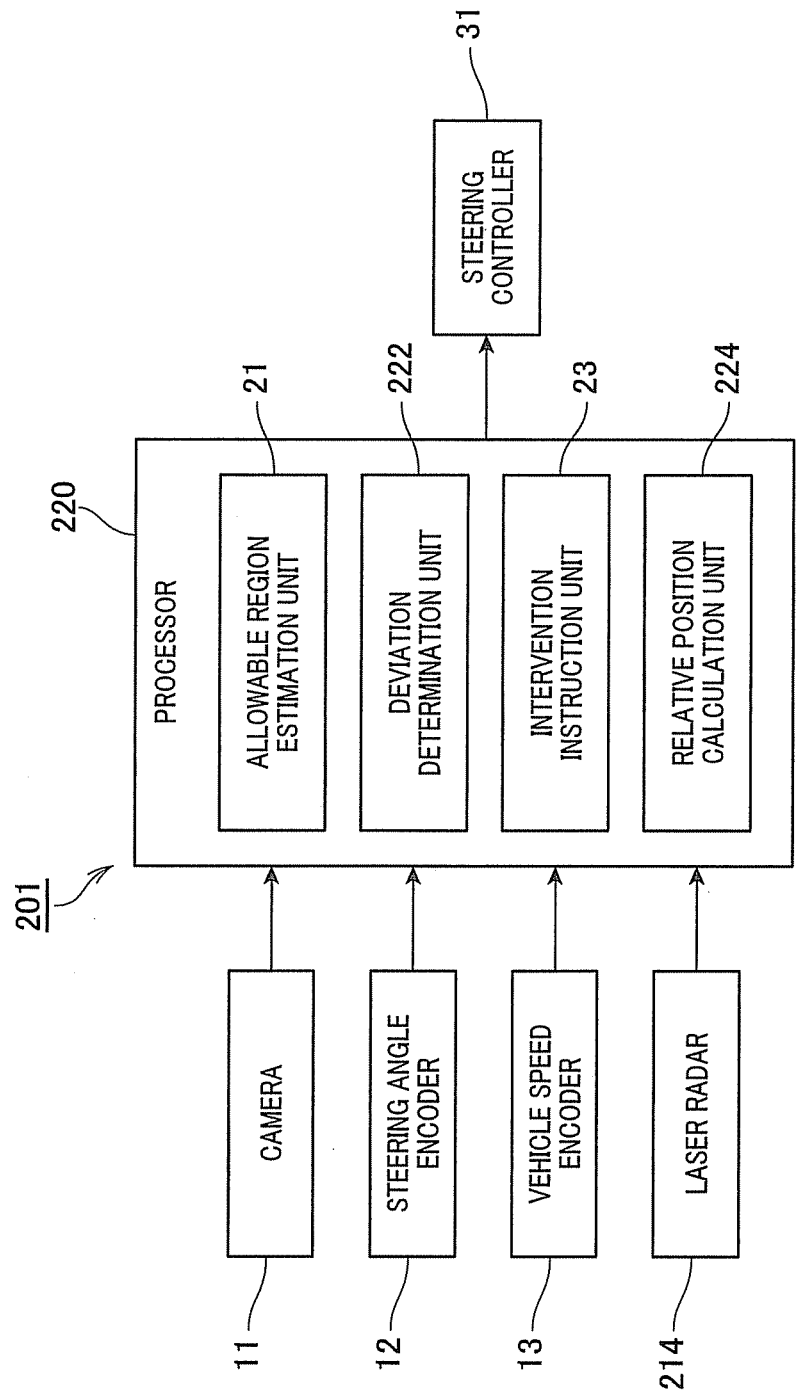
FIG. 9 shows a schematic block diagram of a vehicle driving assistance apparatus in accordance with a third embodiment of the present invention.
Figure 10:
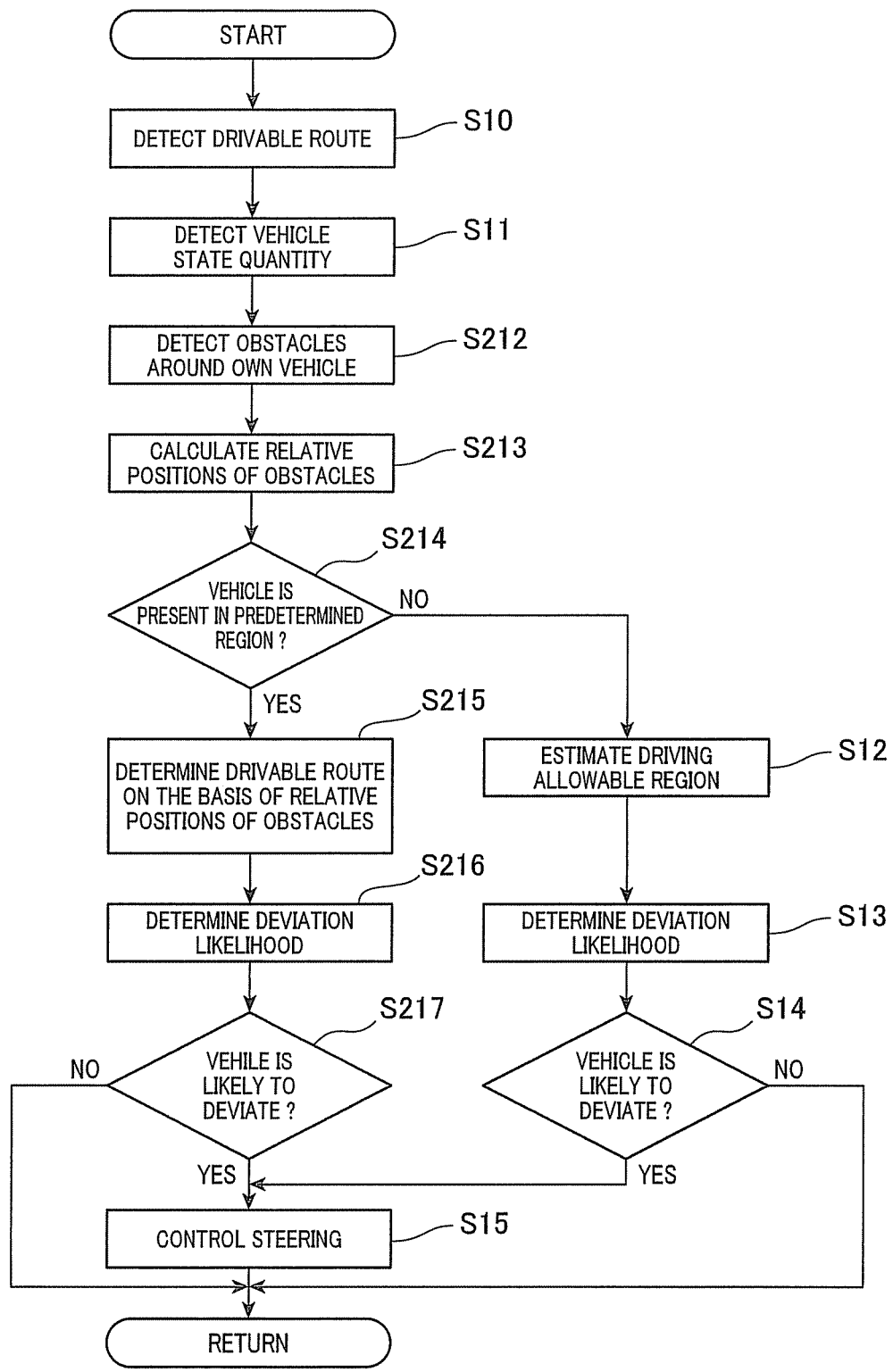
FIG. 10 shows a flowchart of a lane deviation avoidance control process performed in the vehicle driving assistance apparatus of FIG. 9.

The vehicle driving assistance apparatus 201, as shown in FIG. 9, is similar to the vehicle driving assistance apparatus 1 of the first embodiment as described above except that laser radar (serving as a road surface condition acquisition unit) 214 that detects obstacles, such as other vehicles around the own vehicle 2, and a relative position calculation unit 224 are added, and a deviation determination unit 222 replaces the deviation determination unit 22.

The laser radar 214 detects positions of obstacles, such as lane separators (e.g., protuberances and walls) around the own vehicle 2 and other vehicles traveling in adjacent lanes. Information about the positions of the obstacles detected by the laser radar 214 is fed to the relative position calculation unit 224 of the processor 220. In the present embodiment, the laser radar 214 may have a well-known configuration.

The processor 220 primarily includes the allowable region estimation unit 21, the deviation determination unit 222, the intervention instruction unit 23, and the relative position calculation unit 224.

The relative position calculation unit 224 calculates a position of each obstacle relative to the own vehicle 2 (i.e., a relative position of each obstacle) on the basis of the information about the position of the obstacle received from the laser radar 214. In the relative position calculation unit 224, the calculation of the relative position of the obstacle is performed in a well-known manner.

The deviation determination unit 222 determines whether or not the own vehicle 2 will deviate from the drivable route 41 in a similar manner as in the deviation determination unit 22 of the first embodiment except that the deviation determination unit 222 takes into account the relative position of the obstacle detected by the laser radar 214. The process of determining whether or not the own vehicle 2 will deviate from the drivable route 41 will be explained later in detail.

There will now be explained a lane deviation avoidance control process for avoiding the own vehicle 2 from deviating from the drivable route 41, performed in the vehicle driving assistance apparatus 201 configured as above, with reference to a flowchart of FIG. 10.

The operations of steps S10 through S11 subsequent to the initiation of the preceding-vehicle following control are similar to those of the first embodiment, which therefore are not described in detail for the present embodiment.

After receiving the signals from the steering angle encoder 12 and the vehicle speed encoder 13, the relative position calculation unit 224 of the processor 220 detects positions of obstacles in an environment around the own vehicle 2 in step S212. More specifically, a signal to instruct the laser radar 214 to measure the positions of the obstacles is fed to the laser radar 214.

After measuring the positions of the obstacles, the relative position calculation unit 224 determines a position of each obstacle relative to the own vehicle 2 in step S213. The relative position calculation unit 224 further determines whether or not the own vehicle 2 is present in a predetermined region 203, as shown in FIG. 11, extending around each obstacle having a relative position determined, such as a vehicle 202 (other than the own vehicle 2) traveling in an adjacent overtaking lane as shown in FIG. 11 in step S214.

If it is determined in step S214 that the own vehicle 2 is not present in the predetermined region 203, then the operations of subsequent steps S12 through S15 are repeated as in first embodiment.

If it is determined in step S214 that the own vehicle 2 is present in the predetermined region 203, then the deviation determination unit 222 of the processor 220 determines a drivable route 241 as a function of the relative position of the other vehicle 202 in step S215.

Figure 11:
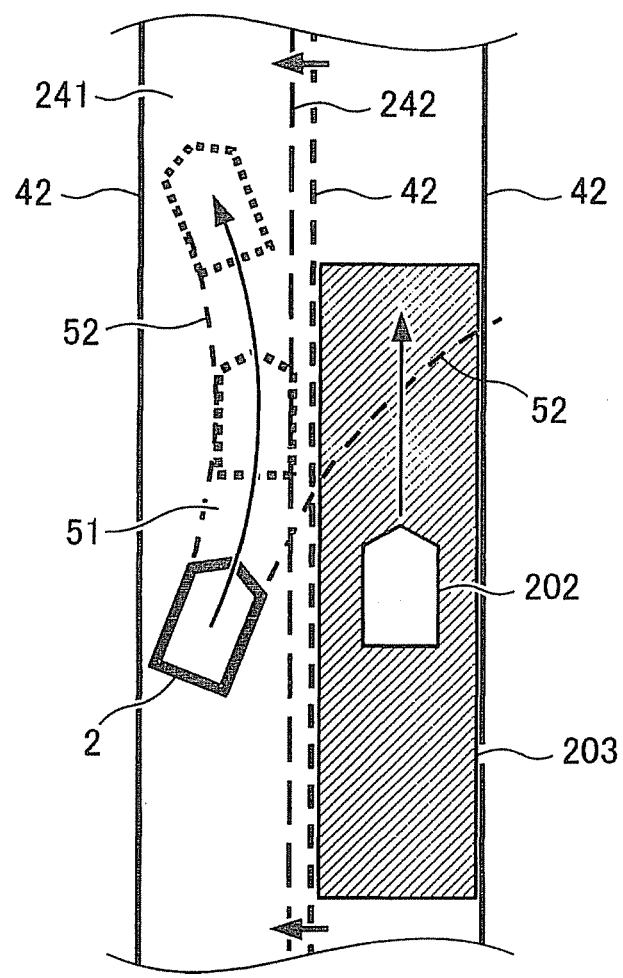
FIG. 11 shows a change in demarcation of a drivable route caused by the presence of a vehicle traveling in an adjacent lane.

In the present embodiment, the drivable route 241, as shown in FIG. 11, is different from the drivable route 41 of the first embodiment (see FIG. 3) bordered only by two lane markings 42 in that the drivable route 241 is bordered by the lane marking 42 on the left-hand side of the own vehicle 2 and an imaginary demarcation line 242. The demarcation line 242 extends between the own vehicle 2 and the other vehicle 202 and parallel to the lane marking 42 on the right-hand side of the own vehicle 2 extending between the own vehicle 2 and the other vehicle 202. The demarcation line 242 is closer to the own vehicle 2 than the lane marking 42 on the right-hand side of the own vehicle 2.

Thereafter, in step S216, the deviation determination unit 222 determines the likelihood that the own vehicle 2 will deviate from the drivable route 241. More specifically, the likelihood of reaching the demarcation line 242 is determined. The likelihood determination process performed in the deviation determination unit 222 is similar to the likelihood determination process performed in the deviation determination unit 22 of the first embodiment except that the drivable route 41 is replaced with the drivable route 241, which therefore is not explained in detail for the present embodiment.

The deviation determination unit 222, in step S217, determines whether or not the own vehicle 2 is likely to deviate from the drivable route 241 on the basis of the determination result of step S216. If it is determined in step S217 that the own vehicle 2 is not likely to deviate from the drivable route 241, then the process returns to step S10 and is repeated therefrom as described above in the processor 220.

If it is determined in step S217 that the own vehicle 2 is likely to deviate from the drivable route 241, then the deviation determination unit 222 outputs a signal indicative of the determination result to the intervention instruction unit 23. The intervention instruction unit 23, in step S15, outputs a steering control signal to the steering controller 31 to control the steering of the own vehicle 2. Thereafter, the process returns to step S10 and is repeated as described above.

With this configuration, displacing the other-vehicle side demarcation line of the drivable route 241 in a lateral direction away from the other vehicle 202, that is, establishing the demarcation line 242 as shown in FIG. 11, may prevent the occupants from sensing a danger that the own vehicle 2 will reach or collide with the other vehicle 202.

For example, assuming that the other-vehicle side lane marking 42 of the drivable route 41 (the middle lane marking 42 of FIG. 11) is continuously used as a demarcation line of the drivable route 41 even when the own vehicle 2 is present in the predetermined region 203 around the vehicle 202, the own vehicle and the other vehicle 202 may get too close to each other, which may make the occupants sense a danger that the own vehicle 2 will contact or collide with the other vehicle 202. Displacing the demarcation line of the drivable route 241 in a lateral direction away from the other vehicle 202 so as to initiate the lane deviation avoidance control at an earlier timing and thereby ensure a sufficient distance between the own vehicle 2 and the other vehicle 202 may prevent the occupants from becoming unnecessarily concerned.

Fourth Embodiment

There will now be explained a fourth embodiment of the present invention with reference to FIG. 12 through FIG. 13. The vehicle driving assistance apparatus 301 of the present embodiment is similar to the vehicle driving assistance apparatus 1 of the first embodiment except for a process of estimating the driving allowable region. Only differences of the fourth embodiment from the first embodiment are explained. Similar descriptions are not repeated in detail for the present embodiment.

Figure 12:
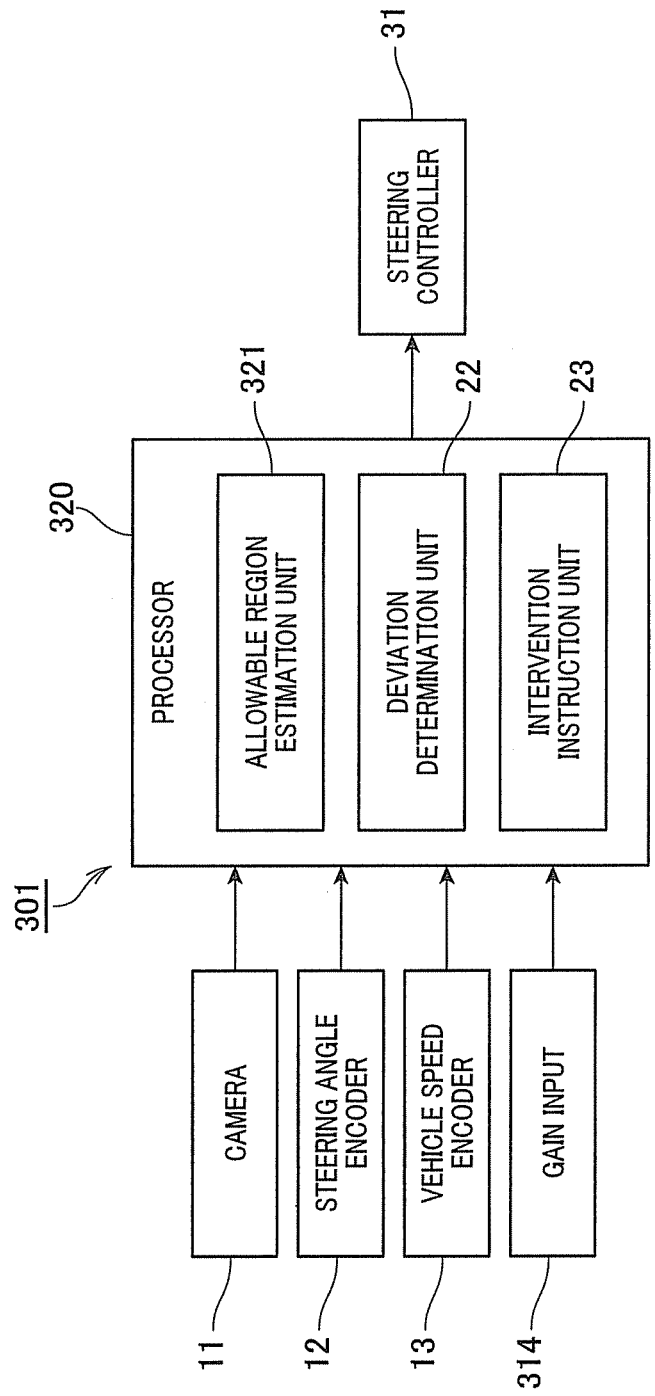
FIG. 12 shows a schematic block diagram of a vehicle driving assistance apparatus in accordance with a fourth embodiment of the present invention.
Figure 13:
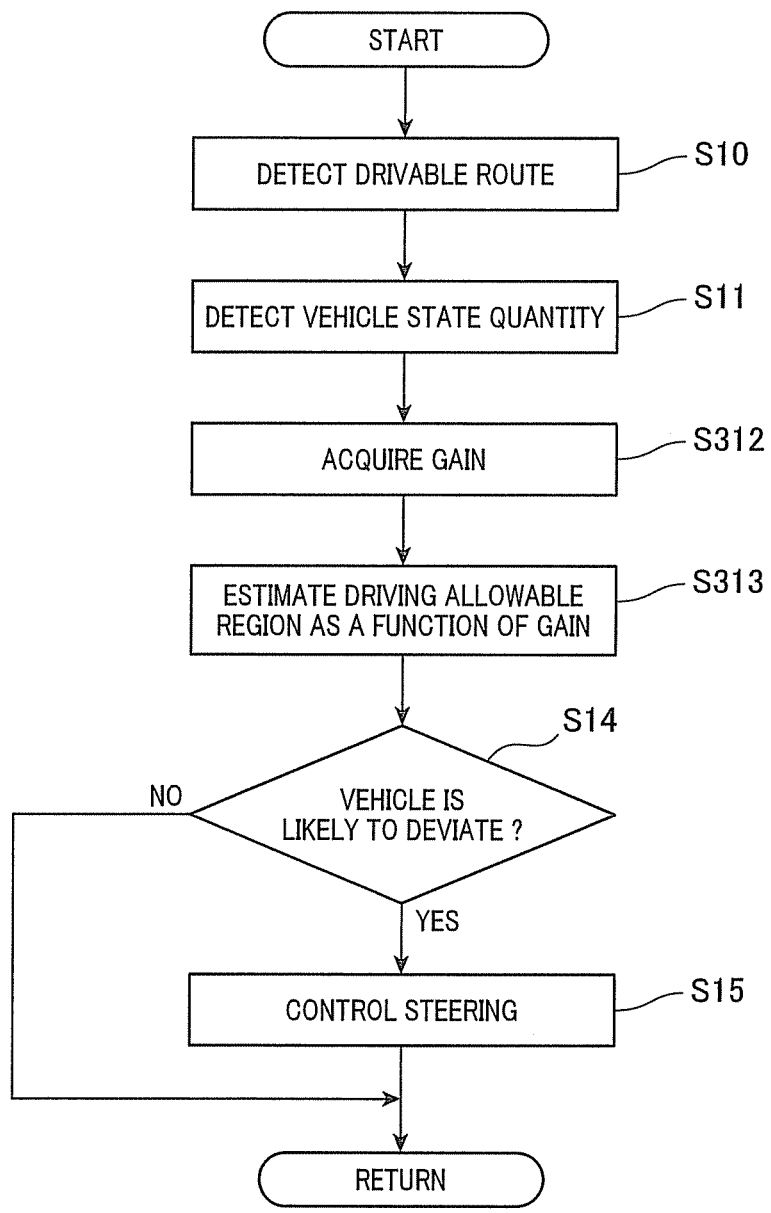
FIG. 13 shows a flowchart of a lane deviation avoidance control process performed in the vehicle driving assistance apparatus of FIG. 12.

The vehicle driving assistance apparatus 301, as shown in FIG. 12, is similar to the vehicle driving assistance apparatus 1 of the first embodiment as described above except that a gain input (serving as a parameter input) 314 is added for receiving gains as parameters used to estimate a driving allowable region 51 and an allowable region estimation unit 321 replaces the allowable region estimation unit 21. The parameters include, but not limited to, curvatures that define shapes of left and right driving allowable limit lines 52 of the driving allowable region 51, a distance between the left and right driving allowable limit lines 52 of the driving allowable region 51, or others.

The gain input 314 receives from the occupants of the own vehicle 2 gains that are parameters used to estimate the driving allowable region 51. In the present embodiment, the gain input 314 is, but not limited to, a dial gauge adapted to receive gains (parameters), such as curvatures defining shapes of left and right driving allowable limit lines 52 of the driving allowable region 51.

The processor 320 primarily includes the allowable region estimation unit 321, the deviation determination unit 22, and the intervention instruction unit 23. The deviation determination unit 22 and the intervention instruction unit 23 of the processor 320 are similar to those of the first embodiment.

The allowable region estimation unit 321 estimates the driving allowable region 51 in a similar manner as in the allowable region estimation unit 21 of the first embodiment except that the driving allowable region 51 is estimated further on the basis of the gains received from the gain input 314. A process of estimating the driving allowable region 51 to be performed in the allowable region estimation unit 121 will be explained later.

There will now be explained a lane deviation avoidance control process for avoiding the own vehicle 2 from deviating from the drivable route 41, performed in the vehicle driving assistance apparatus 301 configured as above, with reference to a flowchart of FIG. 13.

The operations of steps S10 through S11 subsequent to the initiation of the preceding-vehicle following control are similar to those of the first embodiment, which therefore are not described in detail for the present embodiment.

After receiving the signals from the steering angle encoder 12 and the vehicle speed encoder 13, the allowable region estimation unit 321 of the processor 320 acquires gains from the gain input 314 in step S312. The allowable region estimation unit 321 estimates a driving allowable region 51 as a function of the acquired gains.

More specifically, the allowable region estimation unit 321 estimates the shapes of the left and right driving allowable limit lines 52 on the basis of the acquired gains and estimates the driving allowable region 51 on the basis of the estimated driving allowable limit line 52. The operations of steps S14 through S15 subsequent to step S313 to be performed in processor 320 are similar to those of the first embodiment, which therefore are not explained in detail for the present embodiment.

As described above, use of the driving allowable region 51 determined by using the parameters (gains) received from the occupants of the own vehicle 2 enables the assistance matching the perception of the occupants in avoiding the own vehicle 2 from deviating from the drivable route 41. For example, the occupants desiring earlier assistance in the lane deviation avoidance may input parameters (gains) for narrowing the driving allowable region 51 into the gain input 314. This makes the timing earlier, at which it is determined that the minimum width of the overlap region between the drivable route 41 and the allowable region 51 is less than the predetermined threshold d for the deviation determination, thereby allowing the lane deviation avoidance assistance to be initiated at an earlier timing.

Fifth Embodiment

There will now be explained a fifth embodiment of the present invention with reference to FIG. 14 through FIG. 15.

The vehicle driving assistance apparatus 401 of the present embodiment is similar to the vehicle driving assistance apparatus 1 of the first embodiment except for a process of determining the drivable route. Only differences of the fifth embodiment from the first embodiment are explained. Similar descriptions are not repeated in detail for the present embodiment.

Figure 14:
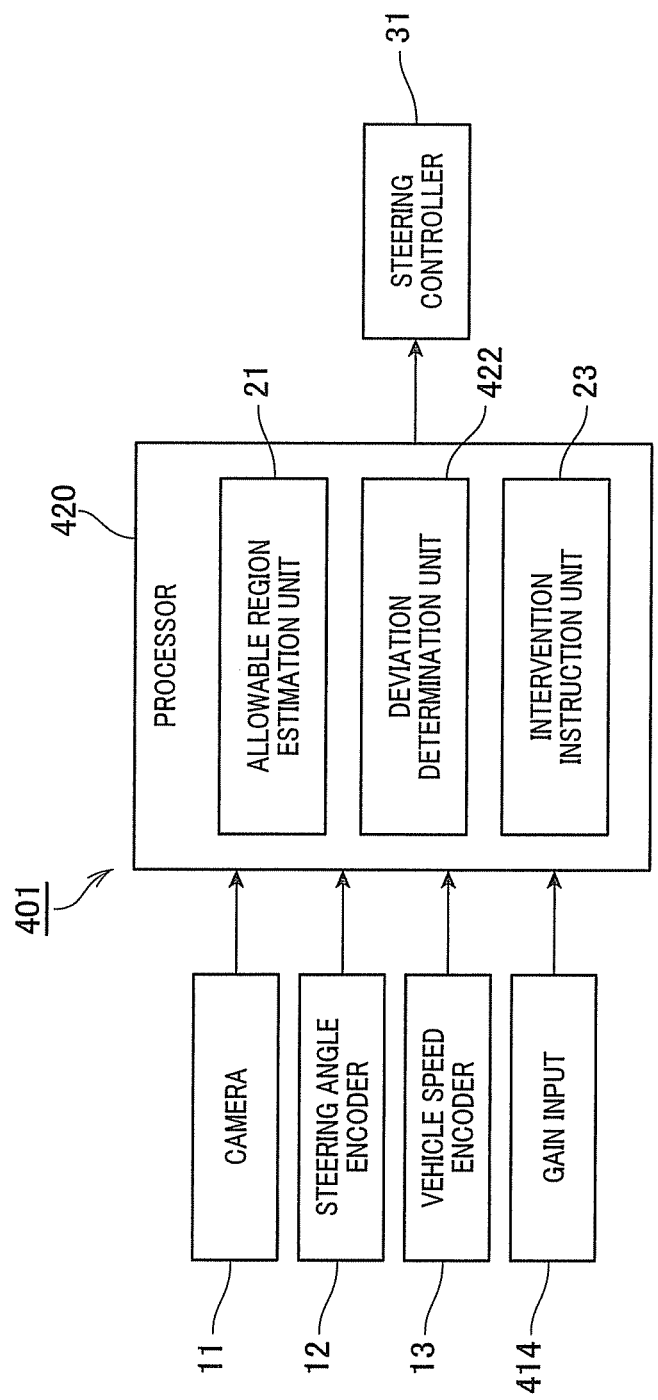
FIG. 14 shows a schematic block diagram of a vehicle driving assistance apparatus in accordance with a fifth embodiment of the present invention.
Figure 15:
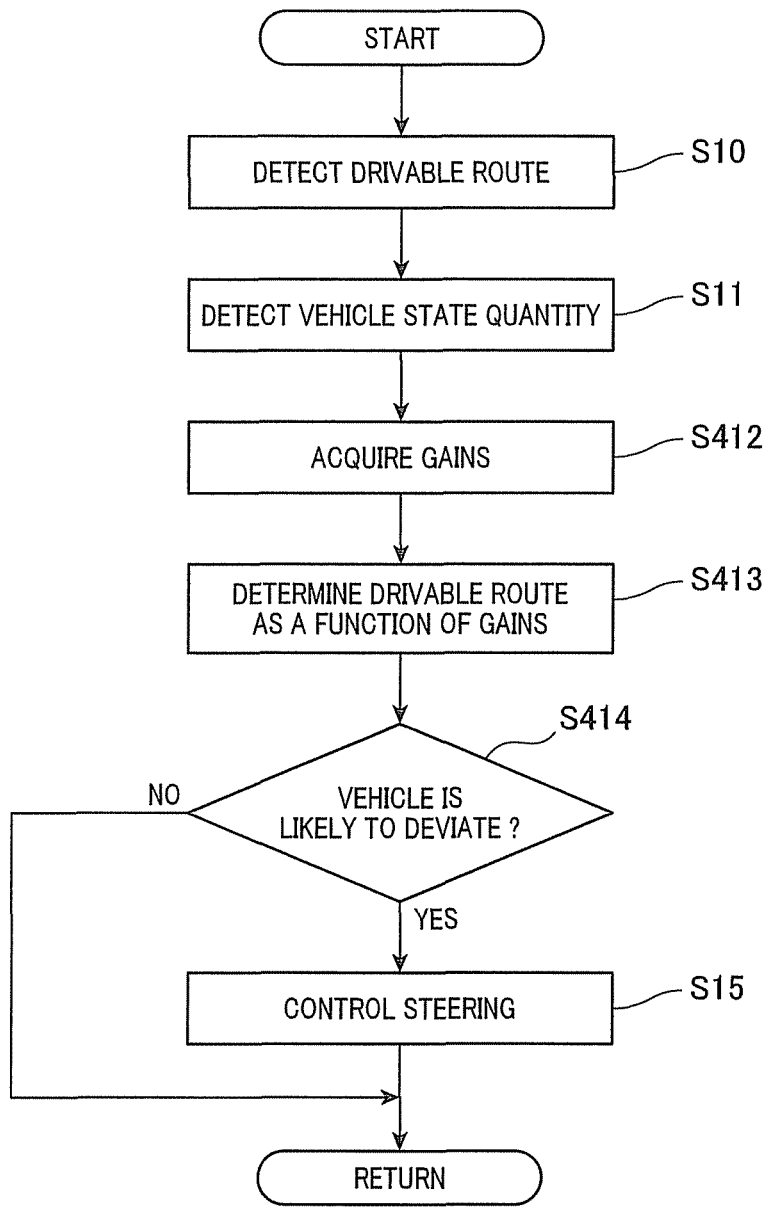
FIG. 15 shows a flowchart of a lane deviation avoidance control process performed in the vehicle driving assistance apparatus of FIG. 14.

The vehicle driving assistance apparatus 401, as shown in FIG. 14, is similar to the vehicle driving assistance apparatus 1 of the first embodiment as described above except that a gain input (serving as a parameter input) 414 is added for receiving an instruction to change a position of a demarcation line 242 used to determine a drivable route 241 and a deviation determination unit 422 replaces the deviation determination unit 22 of the processor 20.

The gain input 414 receives from the occupants of the own vehicle 2 an instruction for changing a position of the demarcation line 242 used to determine the drivable route 241 (see FIG. 11). In the present embodiment, the gain input 414 is, but not limited to, a dial gauge adapted to receive gains, such as a displacement amount and a displacement direction of the demarcation line 242 from the position of the other-vehicle side lane marking 42 between the own vehicle 2 and the other vehicle 202.

The processor 420 primarily includes the allowable region estimation unit 21, the deviation determination unit 422, and the intervention instruction unit 23.

The deviation determination unit 422 determines whether or not the own vehicle 2 will deviate from the drivable route 241 in a similar manner as in the deviation determination unit 22 of the first embodiment except that the drivable route 241, instead of the drivable route 41, is determined further on the basis of the gains received via the gain input 414. The determination of whether or not the own vehicle 2 will deviate from the drivable route 241 made in the deviation determination unit 422 will be explained later.

There will now be explained a lane deviation avoidance control process for avoiding the own vehicle 2 from deviating from the drivable route 241, performed in the vehicle driving assistance apparatus 401 configured as above, with reference to a flowchart of FIG. 15.

The operations of steps S10 through S11 subsequent to the initiation of the preceding-vehicle following control are similar to those of the first embodiment, which therefore are not described in detail for the present embodiment.

After receiving the signals from the steering angle encoder 12 and the vehicle speed encoder 13, the deviation determination unit 422 of the processor 420 acquires gains via the gain input 414 in step S412. The deviation determination unit 422 determines a drivable route 241 as a function of the acquired gains in step S413.

More specifically, a position of the demarcation line 242 is determined on the basis of a displacement amount and a displacement direction of the demarcation line 242 from the position of the lane marking 42, which are the acquired gains. The drivable route 241 is determined on the basis of the determined demarcation line 242 and the other-vehicle side lane marking 42.

The deviation determination unit 422 determines the likelihood that the own vehicle 2 will deviate from the drivable route 241, more specifically, the likelihood of reaching the demarcation line 242. It is determined on the basis of the determination result whether or not the own vehicle 2 is likely to deviate from the drivable route 241 in step S414. The likelihood determination process performed in the deviation determination unit 422 is similar to the likelihood determination process performed in the deviation determination unit 22 of the first embodiment except that the drivable route 41 is replaced with the drivable route 241, which therefore is not explained in detail for the present embodiment.

If it is determined in step S414 that the own vehicle 2 is not likely to deviate from the drivable route 241, then the process returns to step S10 and is repeated therefrom as described above in the processor 420.

If it is determined in step S414 that the own vehicle 2 is likely to deviate from the drivable route 241, then the deviation determination unit 422 outputs a signal indicative of the determination result to the intervention instruction unit 23. The intervention instruction unit 23, in step S15, outputs a steering control signal to the steering controller 31 to control the steering of the own vehicle 2. Thereafter, the process returns to step S10 and is repeated therefrom as described above in the processor 420.

As described above, use of the drivable route 241 determined by using the position of the demarcation line 242 received from the occupants of the own vehicle 2 enables the assistance matching the perception of the occupants in avoiding the own vehicle 2 from deviating from the drivable route 241. For example, the occupants desiring earlier assistance in lane deviation avoidance input the instruction into the gain input 414 for displacing the demarcation line 242 of the drivable route 241 toward the own vehicle 2. This makes the timing earlier, at which it is determined that the minimum width of the overlap region between the drivable route 241 and the allowable region 51 is less than the predetermined threshold d for the deviation determination, thereby allowing the assistance in lane deviation avoidance to be initiated at an earlier timing.

Sixth Embodiment

There will now be explained a sixth embodiment of the present invention with reference to FIG. 16 through FIG. 17.

The vehicle driving assistance apparatus 501 of the present embodiment is similar to the vehicle driving assistance apparatus 1 of the first embodiment except that a status indicator is provided. Only differences of the sixth embodiment from the first embodiment are explained. Similar descriptions are not repeated in detail for the present embodiment.

Figure 16:
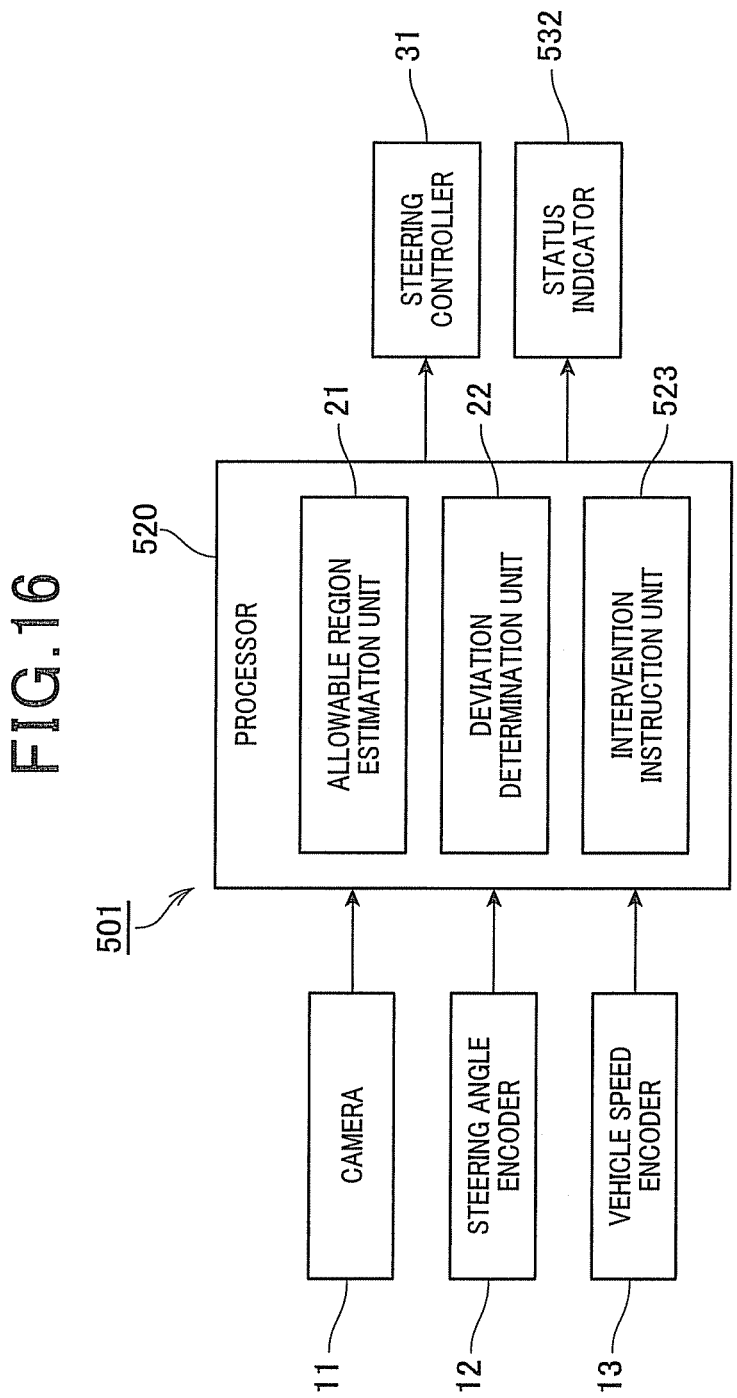
FIG. 16 shows a schematic block diagram of a vehicle driving assistance apparatus in accordance with a sixth embodiment of the present invention.
Figure 17:
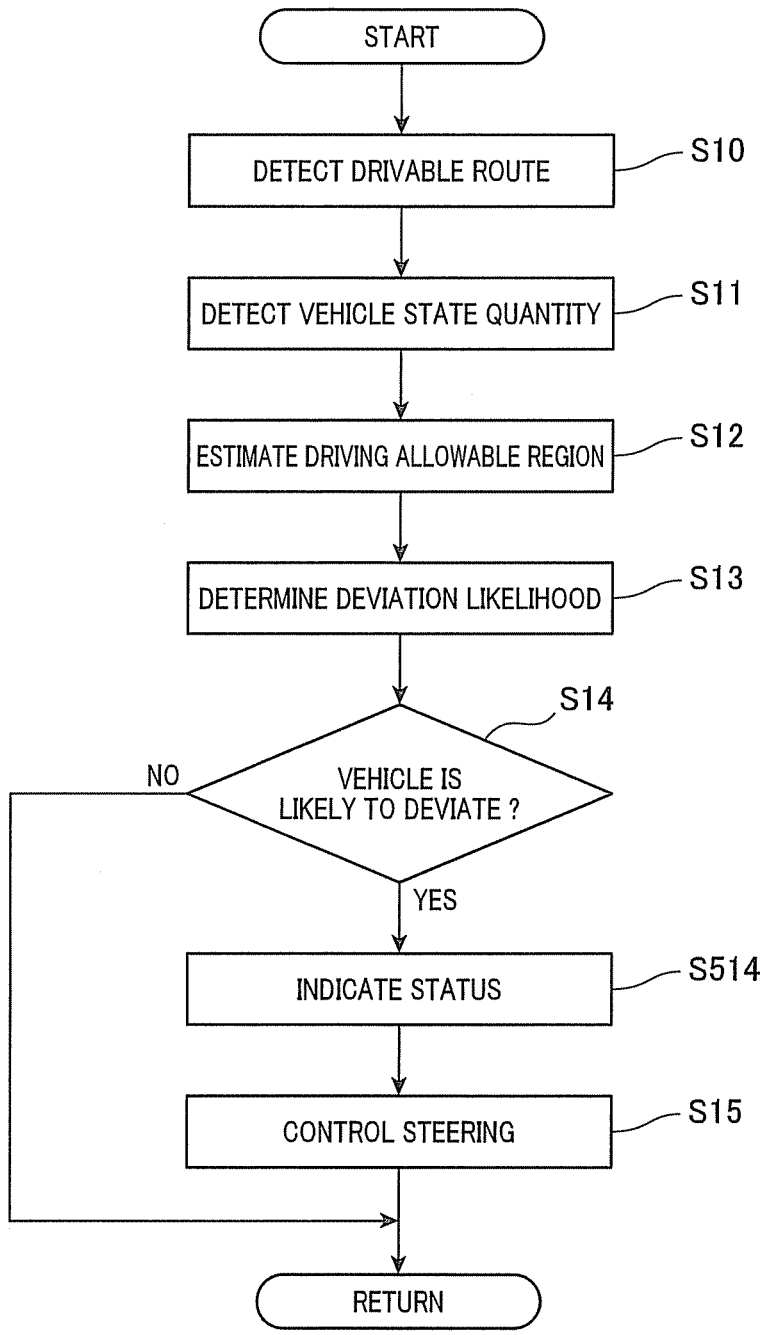
FIG. 17 shows a flowchart of a lane deviation avoidance control process performed in the vehicle driving assistance apparatus of FIG. 16.

The vehicle driving assistance apparatus 501, as shown in FIG. 16, is similar to the vehicle driving assistance apparatus 1 of the first embodiment as described above except that a status indicator (serving as an indicator) 532 is added for indicating a controlled status by the vehicle driving assistance apparatus 501 and an intervention instruction unit 523 replaces the intervention instruction unit 23 of the processor 20.

The status indicator 532 indicates to the occupants of the own vehicle 2 the determination result of the deviation determination unit 22 of the processor 520 and contents of intervention control to be conducted by the intervention instruction unit 23. In the present embodiment, the status indicator 532 includes, but not limited to, a speaker that generates a voice to indicate the information to the occupants. Alternatively, the status indicator 532 may include a display, an illuminator, such as LED (a semiconductor light-emitting diode), a vibrator which uses a motor or the like to generate a vibration.

There will now be explained a lane deviation avoidance control process for avoiding the own vehicle 2 from deviating from the drivable route 41, performed in the vehicle driving assistance apparatus 501 configured as above, with reference to a flowchart of FIG. 17. The operations of steps S10 through S14 subsequent to the initiation of the preceding-vehicle following control are similar to those of the first embodiment, which therefore are not described in detail for the present embodiment.

If it is determined in step S14 that the own vehicle 2 is likely to deviate from the drivable route 41, then the deviation determination unit 22 outputs a signal indicative of the determination result to the intervention instruction unit 523. The intervention instruction unit 523, in step S514, outputs to the status indicator 532 a control signal for indicating the determination result of the deviation determination unit 22 and the contents of intervention control to be conducted by the intervention instruction unit 23.

In response to the control signal received from the intervention instruction unit 523, the status indicator 532 outputs voice messages to indicate to the occupants of the own vehicle 2 the determination result of the deviation determination unit 22 and the contents of intervention control to be conducted by the intervention instruction unit 23. For example, the status indicator 532 may be controlled to output a voice message like "Pong. The vehicle is deviating from the lane. Automatic steering control is started." Further, upon termination of the assistance in lane deviation avoidance by the vehicle driving assistance apparatus 501, the status indicator 532 may be controlled to output a voice message like "Pong, pong. The control is over."

Thereafter, in step S15, the status indicator 532 outputs a steering control signal to the steering controller 31 to control the steering of the own vehicle 2. The process then returns to step S10 and is repeated therefrom as described above in the processor 520.

If it is determined in step S14 that the own vehicle 2 is not likely to deviate from the drivable route 41, then the process returns to step S10 and is repeated therefrom as described above in the processor 520.

With this configuration, the occupants are made aware of the determination result of the deviation determination unit 22 and the contents of the intervention control to be conducted by the intervention instruction unit 23 via the status indicator 532, which may prevent the occupants from feeling anxiety about the vehicle behavior. That is, when the intervention control conducted by the vehicle driving assistance apparatus 501 causes an unintended behavior of the own vehicle 2, knowledge of the contents of the intervention control may prevent the occupants from feeling anxiety about the vehicle behavior. In addition, knowledge of the determination result of the deviation determination unit 22 allows the occupants to predict changes in behavior of the own vehicle 2, which may also prevent the occupants from feeling anxiety about the vehicle behavior.

Seventh Embodiment

There will now be explained a seventh embodiment of the present invention with reference to FIG. 18 through FIG. 19.

The vehicle driving assistance apparatus 601 of the present embodiment is similar to the vehicle driving assistance apparatus 501 of the sixth embodiment except that the steering control reflecting an occupant's intention is performed. Only differences of the seventh embodiment from the sixth embodiment are explained. Similar descriptions are not repeated in detail for the present embodiment.

Figure 18:
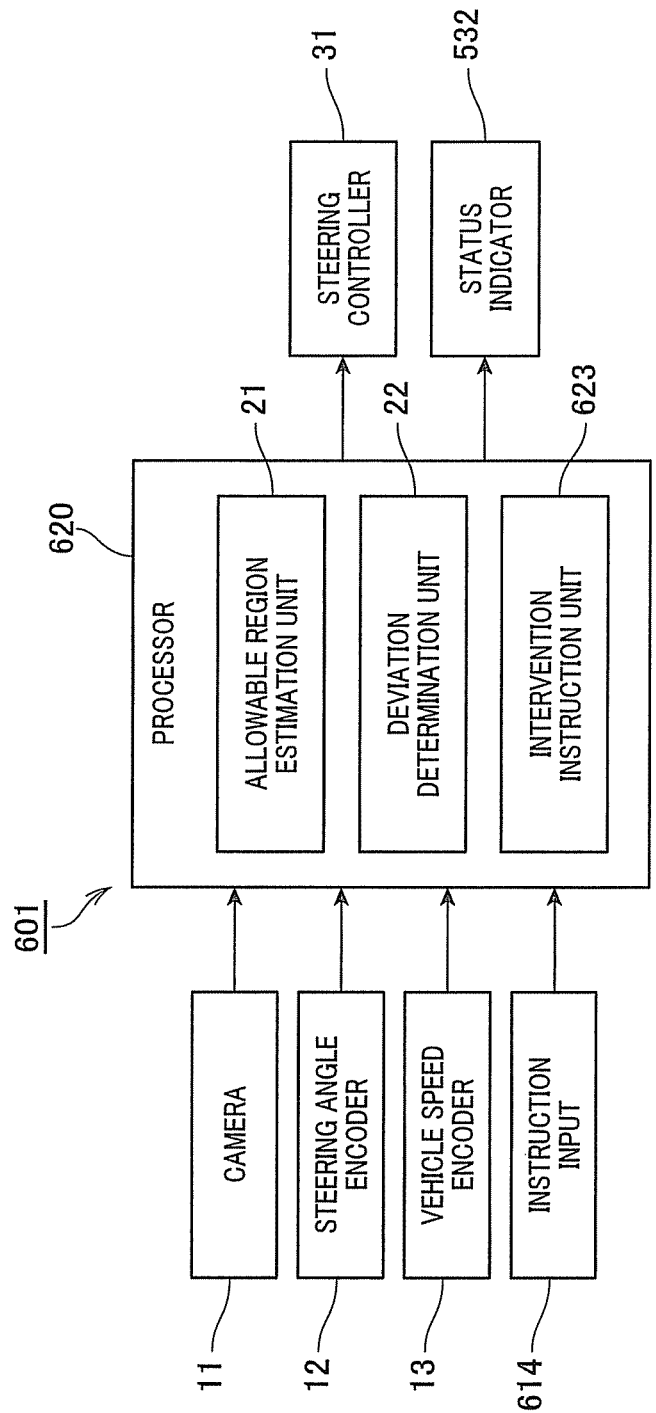
FIG. 18 shows a schematic block diagram of a vehicle driving assistance apparatus in accordance with a seventh embodiment of the present invention.

The vehicle driving assistance apparatus 601, as shown in FIG. 18, is similar to the vehicle driving assistance apparatus 501 of the sixth embodiment as described above except that an instruction input 614 is added for receiving an instruction from the occupants of the own vehicle 2 and an intervention instruction unit 623 replaces the intervention instruction unit 523 of the processor 520.

The instruction input 614 receives, from the occupants of the own vehicle 2 made aware of information indicated by the status indicator 532, an instruction of whether to implement the contents of the intervention control to be conducted by the intervention instruction unit 623. The instruction inputted into the instruction input 614 is fed to the intervention instruction unit 623 of the processor 620. The instruction input 614 may include, but not limited to, a well-known input unit, such as a switch or the like. The instruction input 614 may be a separate component from the status indicator 532, or may be integrated into the status indicator 532, for example, in the form of an electronic component, such as a touch panel combining a display device and a position input device.

There will now be explained a lane deviation avoidance control process for avoiding the own vehicle 2 from deviating from the drivable route 41, performed in the vehicle driving assistance apparatus 601 configured as above, with reference to a flowchart of FIG. 19.

The operations of steps S10 through S514 subsequent to the initiation of the preceding-vehicle following control are similar to those of the sixth embodiment, which therefore are not described in detail for the present embodiment.

The occupants looking at the status indicator 532 become aware of the determination result that the own vehicle 2 is likely to deviate from the drivable route 41 and the contents of the automatic steering based lane deviation avoidance control. In response to the information from the status indicator 532, the occupants input into the instruction input 614 an instruction of whether to implement the lane deviation avoidance control or an instruction of offsetting a travel path of the own vehicle 2 via automatic steering and the like in step S614.

In response to the instruction received from the instruction input 614, the intervention instruction unit 623 outputs a control signal into the steering controller 31 in step S15. After the steering control signal is fed to the steering controller 31, the process returns to step S10 and is repeated therefrom as described above in the processor 620.

With this configuration, the occupants of the own vehicle 2 determine whether to implement the contents of the automatic steering based lane deviation avoidance control, which leads to the assistance reflecting an intention of the occupants in the lane deviation avoidance control. That is, when the occupants desire to travel along the drivable route 41, the occupants are allowed to determine to implement the contents of the lane deviation avoidance control. When the occupants desire to move out of the drivable route 41 to enter another drivable route, the occupants are allowed to determine not to implement the contents of the lane deviation avoidance control. This may prevent a discrepancy between the intention of the occupants and the contents of the lane deviation avoidance control, which ensures comfortable and safe driving of the own vehicle 2.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A vehicle driving assistance apparatus mounted in a subject vehicle, the apparatus comprising:
   a lane detection unit configured to detect a traveling lane in which the subject vehicle is traveling;
   a vehicle state quantity detection unit configured to detect state quantities of the subject vehicle, the vehicle state quantity detection unit including a steering angle detector configured to detect a steering angle as a first state quantity and a vehicle speed detector configured to detect a speed of the subject vehicle as a second state quantity;
   a processor configured to determine whether or not the subject vehicle will deviate from the traveling lane, and based on a determination result, output a control signal for controlling the steering angle; and
   a steering controller configured to control steering of the subject vehicle in response to the control signal from the processor;
   wherein the processor operates as:
   an allowable region estimation unit configured to estimate a driving allowable region on the basis of the state quantities detected by the vehicle state quantity detection unit and a predetermined allowable range of behavior of the subject vehicle wherein the driving allowable region is a region where the subject vehicle is allowed to travel by changing its traveling direction with a behavior of the subject vehicle kept within the predetermined allowable range of behavior of the subject vehicle;
   a deviation determination unit configured to compare a minimum width of an overlap region of the traveling lane and the driving allowable region estimated by the allowable region estimation unit with a predetermined threshold for determining whether or not the subject vehicle will deviate from the traveling lane, wherein the predetermined threshold is equal to or greater than a width of the subject vehicle; and
   an intervention instruction unit configured to, when it is determined by the deviation determination unit that the minimum width of the overlap region is less than the predetermined threshold, output to the steering controller an intervention control signal for instructing the steering controller to perform intervention control of steering of the subject vehicle.

2. The apparatus of claim 1, further comprising a road surface condition acquisition unit configured to acquire a road surface condition of the traveling lane,
   the allowable region estimation unit alters the driving allowable region as a function of the road surface condition acquired by the road surface condition acquisition unit.

3. The apparatus of claim 2, wherein the road surface condition acquisition unit comprises a road-vehicle communication unit and the road surface condition acquisition unit is configured to acquire a road-surface friction coefficient as the road surface condition on the basis of information received from a road manager.

4. The apparatus of claim 2, wherein the road surface condition acquisition unit comprises an acceleration sensor configured to sense a lateral acceleration of the subject vehicle and is configured to acquire a road-surface friction coefficient as the road surface condition from outputs of the acceleration sensor.

5. The apparatus of claim 2, wherein the road surface condition acquisition unit comprises wheel speed sensors configured to sense respective right and left wheels of the subject vehicle and is configured to acquire a road-surface friction coefficient as the road surface condition on the basis of a difference in wheel speed between right and left wheels detected from outputs of the wheel speed sensors.

6. The apparatus of claim 2, wherein the road surface condition acquisition unit comprises a laser radar configured to detect an obstacle in an environment around the subject vehicle and determines a position of the obstacle relative to the subject vehicle, the deviation determination unit determines whether or not the subject vehicle is present in a predetermined region around the obstacle on the basis of the relative position of the obstacle, and when it is determined that the subject vehicle is present in the predetermined region around the obstacle, displaces an obstacle-side demarcation line of the traveling lane in a lateral direction away from the obstacle.

7. The apparatus of claim 1, further comprising a parameter input configured to receive parameters used by the allowable region estimation unit to estimate the driving allowable region, and the allowable region estimation unit estimates the driving allowable region on the basis the parameters received from the parameter input.

8. The apparatus of claim 7, wherein the parameter input receives an instruction for changing a position of the demarcation line of the traveling lane, and the deviation determination unit determines whether or not the minimum width of the overlap region of the driving allowable region and the traveling lane, a demarcation line position of which traveling lane has been changed in response to the instruction received from the parameter input, is less than the predetermined threshold.

9. The apparatus of claim 1, further comprising an indicator configured to indicate to occupants of the subject vehicle at least either one or both of the determination result of the deviation determination unit and the content of intervention control to be conducted by the intervention instruction unit.

10. The apparatus of claim 9, wherein the indicator indicates to the occupants of the subject vehicle the determination result of the deviation determination unit and the content of intervention control to be conducted by the intervention instruction unit, the apparatus further comprises an instruction input configured to receive, from the occupants of the subject vehicle, at least an instruction of whether to implement the content of the intervention control indicated by the indicator, and the intervention instruction unit implements the intervention control of steering of the subject vehicle in response to the instruction received from the instruction input.

11. The apparatus of claim 1, wherein the predetermined allowable range of behavior of the subject vehicle is an allowable range of lateral G-force experienced by the subject vehicle, and the driving allowable region is a region where the subject vehicle is allowed to travel by changing its traveling direction with the lateral G-force experienced by the subject vehicle kept within the allowable range of lateral G-force experienced by the subject vehicle.

* * * * *